United States Patent
Feng

(10) Patent No.: US 9,791,956 B2
(45) Date of Patent: Oct. 17, 2017

(54) TOUCH PANEL CLICK ACTION

(71) Applicant: LENOVO (Singapore) PTE, LTD., New Tech Park (SG)

(72) Inventor: Xin Feng, Morrisville, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 43 days.

(21) Appl. No.: 14/673,080

(22) Filed: Mar. 30, 2015

(65) Prior Publication Data
US 2016/0291708 A1 Oct. 6, 2016

(51) Int. Cl.
| G06F 3/038 | (2013.01) |
| G06F 3/041 | (2006.01) |
| G06F 3/0354 | (2013.01) |
| G06F 3/0488 | (2013.01) |

(52) U.S. Cl.
CPC ............ *G06F 3/0414* (2013.01); *G06F 3/038* (2013.01); *G06F 3/03547* (2013.01); *G06F 3/04883* (2013.01); *G06F 3/04886* (2013.01); G06F 2203/04808 (2013.01)

(58) Field of Classification Search
CPC ................................ G06F 3/044; G06F 3/0414
See application file for complete search history.

(56) References Cited

U.S. PATENT DOCUMENTS

| 7,847,789 B2 * | 12/2010 | Kolmykov-Zotov | G06F 3/03545 178/18.03 |
| 8,754,854 B1 * | 6/2014 | Hamburgen | G06F 3/0489 345/168 |
| 8,830,185 B2 * | 9/2014 | Ryu | G06F 3/044 345/156 |
| 9,041,663 B2 * | 5/2015 | Westerman | G06F 3/03547 345/173 |
| 9,310,995 B2 * | 4/2016 | Westerman | G06F 3/04883 |
| 2006/0066588 A1 * | 3/2006 | Lyon | G06F 3/0488 345/173 |
| 2011/0069029 A1 * | 3/2011 | Ryu | G06F 3/0416 345/173 |
| 2012/0019452 A1 * | 1/2012 | Westerman | G06F 3/04883 345/173 |
| 2012/0019453 A1 * | 1/2012 | Westerman | G06F 3/04883 345/173 |
| 2012/0019469 A1 * | 1/2012 | Westerman | G06F 3/04883 345/173 |
| 2012/0023459 A1 * | 1/2012 | Westerman | G06F 3/03547 715/863 |

(Continued)

*Primary Examiner* — Patrick F Marinelli
(74) *Attorney, Agent, or Firm* — Kunzler Law Group

(57) ABSTRACT

For interpreting a click action, an apparatus includes a touch panel, a processor, and a memory that stores code, executable by the processor, including code that: determines a number of touch points for a click action of the touch panel, determines a touch force for each touch point of the click action, identifies a number of click points for the click action based on the touch force of each touch point, and outputs a click event based on the number of click points. The apparatus may also include code that determines a click location associated with the click action, in response to the number of click points being one, and compares the click location to a first area, wherein outputting a click event includes outputting a primary click event, in response to the click location being within the first area.

20 Claims, 5 Drawing Sheets

(56) References Cited

U.S. PATENT DOCUMENTS

| | | | |
|---|---|---|---|
| 2012/0056837 A1* | 3/2012 | Park | G06F 3/0414 345/173 |
| 2012/0227006 A1* | 9/2012 | Amm | G06F 1/169 715/773 |
| 2015/0185909 A1* | 7/2015 | Gecnuk | G06F 3/044 345/174 |
| 2015/0339320 A1* | 11/2015 | Herron | G06F 17/30994 707/722 |
| 2016/0034177 A1* | 2/2016 | Westerman | G06F 3/04883 715/769 |
| 2016/0063097 A1* | 3/2016 | Brown | G06F 17/30713 707/737 |
| 2016/0125314 A1* | 5/2016 | Mulukutla | G06Q 30/0277 706/12 |

* cited by examiner

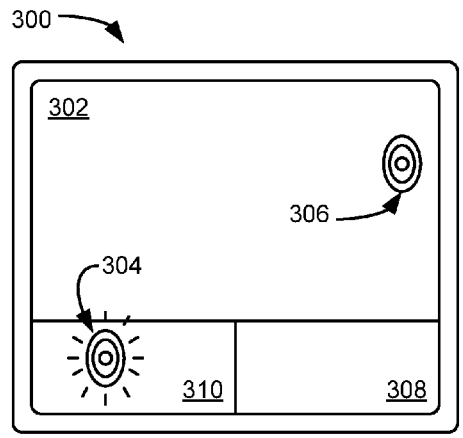
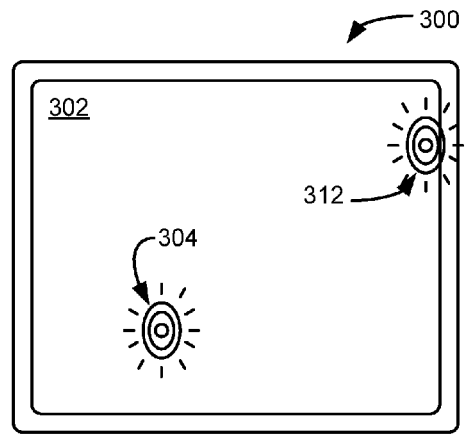
FIG. 3A  FIG. 3B
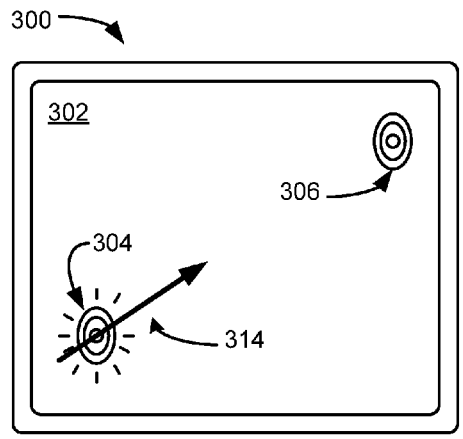
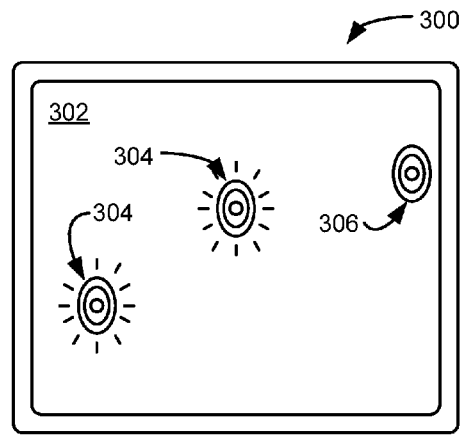
FIG. 3C  FIG. 3D

# TOUCH PANEL CLICK ACTION

FIELD

The subject matter disclosed herein relates to pointer devices and more particularly relates to click actions of touch panel pointer devices.

BACKGROUND

DESCRIPTION OF THE RELATED ART

Touchpad is a human technology interface deployed on many laptop computer. Most touchpad support two types of interaction model: a button-click model, where a click event is based on a location of a point of contact, and click-anywhere model, based on a number of points of contact. However, supporting both of these interaction models may result in conflicts where the user intention is indeterminate, resulting in an unintended output click event.

BRIEF SUMMARY

An apparatus for interpreting touch panel click actions. A method and computer program product also perform the functions of the apparatus. The apparatus includes a touch panel, a processor, and a memory that stores code, executable by the processor, including code that: determines a number of touch points for a click action of the touch panel, determines a touch force for each touch point of the click action; identifies a number of click points for the click action based on the touch force of each touch point, and outputs a click event based on the number of click points.

In some embodiments, identifying the number of click points includes comparing a touch force of each touch point to enforce threshold and incrementing the number of click points for each touch point whose touch force exceeds the force threshold. The apparatus, in certain embodiments, measures the distance between adjacent touch points, in response the number of touch points being two, wherein the forced threshold is based on the distance between adjacent touch points. In some embodiments, identifying the number of click points includes identifying a difference between touch forces for each combination of two touch points, in response to the number of touch points being two, and comparing the difference between touch forces to a force difference threshold, wherein the number of good points for the click action is incremented by one for each difference between touch forces that exceeds the force difference threshold.

The apparatus, in one embodiment, determines a click location associated with the click action, in response to the number of click points being one, and compares the click location to a first area, wherein outputting a click event includes outputting a primary click event, in response to the click location being within the first area. In certain embodiments, outputting a click event may include outputting a secondary click event, in response to the click location being outside the first area. In other embodiments, outputting a click event may include outputting a secondary click event, in response to the number of click points being two. The click location may be a location on the touch panel in the first area may be a region of the touch panel. The primary click event may be a left button click event and the secondary click event may be a right button click event.

The method includes: detecting, by use of a processor, a click action from a touch panel pointing device, identifying a touch force of the click action, determining a number fingers actively involved in the click action based on the touch force, producing a click event based on the number fingers actively involved in the click action. In some embodiments, determining the number fingers actively involved in the click action based on the touch force includes ignoring a finger resting on the touch panel.

In some embodiments, determining the number fingers actively involved in the click action may include: determining a number of touch points of the click action, identifying the touch force associated with each touch point, and incrementing the number of fingers actively involved in the click action, in response to the touch force associated with a touch point exceeding a predefined threshold. In some embodiments, detecting the click action with monitoring for force applied to the touch panel that exceeds the predefined threshold.

The method may also include identifying a click location of the click action, in response to the number fingers actively involved being equal to one, wherein producing the click event is further based on the click location. The method may further include comparing the click location to a first zone, wherein producing the click event based on the click location may include outputting a secondary click action in response to the click location being within the first zone and outputting a primary click action in response to the click location outside the first zone. The method may further include defining a plurality of zones on the touch panel, each zone associated with the click event, where producing the click event based on the click location includes outputting a click event corresponding to the zone containing the click location.

The program product may include a computer readable storage medium that stores code executable by a processor, the executable code comprising code to perform: monitoring for a click action at a touch panel pointing device, determining a number of touch points for the click action, wherein the click action comprises at least one touch point, measuring a touch force associated with each touch point of the click action, determining a number of click points for the click action based on the touch force for each touch point, and generating a pointer event based on the number of click points. In certain embodiments, the pointer event may be a left-button click, a left-button double-click, a right-button click, a right-button double-click, a middle-button click, or a middle-button double-click.

In some embodiments, determining the number of click points for the click action includes incrementing the number of click points in response to the touch force associated with a touch point exceeding a click force threshold. In one embodiment, the program product may further include code to perform: determining a touch panel location for each touch point, wherein determining a number of click points for the click action comprises ignoring a particular touch point located in a boundary region of the touch panel, in response to the touch force associated with the particular touch point being less than a boundary force threshold, the boundary force threshold being greater than the click force threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3A is a schematic block diagram illustrating one embodiment of a touchpad for interpreting a click action;

FIG. 3B is a schematic block diagram illustrating another embodiment of a touchpad for interpreting a click action;

FIG. 3C is a schematic block diagram illustrating another embodiment of a touchpad for interpreting a click action;

FIG. 3D is a schematic block diagram illustrating another embodiment of a touchpad for interpreting a click action;

DETAILED DESCRIPTION

Figure 1:
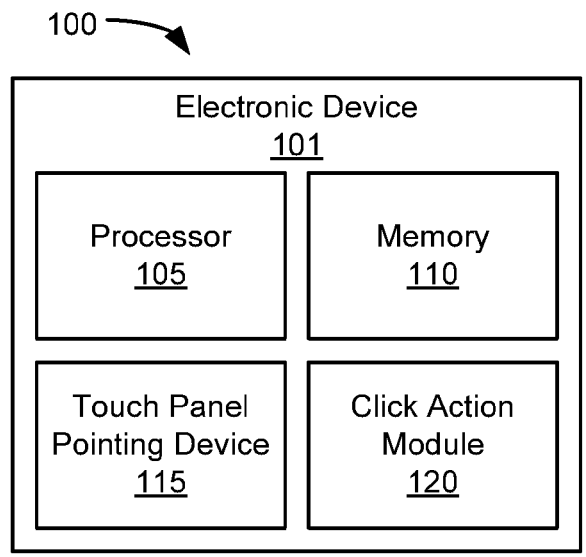
FIG. 1 is a schematic block diagram illustrating one embodiment of a system for interpreting a click action.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the described embodiments identify a user's intent in making a click action on a touchpad or touch panel by measuring forces involved in the active click motion. A click event may be output based on the number of fingers actively involved in the click action. An active finger (e.g., actively involved) is one that applies a significant amount of force to the touchpad during the active click motion, wherein a passive finger (e.g., one that is resting on the touchpad) is one that does not apply a significant amount of force to the touchpad during the active click motion.

When one finger is actively involved in the click action, the described embodiments further determine the active finger location (e.g., relative to the touchpad). If the active finger is within a right click zone (e.g., a first region of the touchpad), then a secondary click event is output. In one embodiment, a primary click event is output if the active finger is outside the write click zone. In another embodiment, a primary click event is output if the active finger is within a left click zone (e.g., a second region of the touchpad).

Further embodiments may define additional click zones (e.g., regions of the touchpad) associated with additional click events (e.g., a tertiary click event if the active finger is within a middle click zone, or third region of the touchpad). When the two fingers are actively involved in the click action, then a secondary click event is output. Additional click events may be supported where there are three or more fingers actively involved in the click action.

FIG. 1 depicts a system 100 for digitally signing a document, according to embodiments of the disclosure. The system 100 includes an electronic device 101. The electronic device 101 may be any digital device capable of receiving a multi-touch click action and outputting a click event, including, but not limited to, a touchpad, a trackpad, a touch screen, and the like. In some embodiments, the electronic device 101 may be an electronic device incorporating a touch panel capable of receiving a multi-touch click action and outputting a click event, including, but not limited to, a mobile phone, a smart phone, a tablet computer, a laptop computer, a desktop computer, a portable gaming console, or the like. The electronic device 101 includes a processor 105, a memory 110, a touch panel pointing device 115, and a click action module 120.

The processor 105, in one embodiment, may comprise any known controller capable of executing computer-readable instructions and/or capable of performing logical operations. For example, the processor 105 may be a microcontroller, a microprocessor, a central processing unit (CPU), a graphics processing unit (GPU), an auxiliary processing unit, a FPGA, or similar programmable controller. In some embodiments, the processor 105 executes instructions stored in the memory 110 to perform the methods and routines described herein. The processor 105 is communicatively coupled to the memory 110, the touch panel pointing device 115, and the click action module 120.

The memory 110, in one embodiment, is a computer readable storage medium. In some embodiments, the memory 110 includes volatile computer storage media. For example, the memory 110 may include a random access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores data relating to interpreting a click action, for example, the memory 110 may store touch point locations, touch forces, click event look-up-tables (LUTs), force thresholds, click areas, and the like. In some embodiments, the memory 110 also stores program code and related data, such as an operating system or other controller algorithms operating on the electronic device 101.

The touch panel pointing device 115, in one embodiment, is a pointing device that includes a multi-touch tactile sensor and a touch force sensor. The multi-touch tactile sensor is configured to identify one or more simultaneous points of contact and locations of said points of contact. For example, the touch panel pointing device 115 may be touchpad or a trackpad. The touch force sensor is configured to measure an amount of force applied to the touch panel pointing device 115, particularly during a user's click action. In certain embodiments, the touch panel pointing device 115 may include a pressure sensor, capacitive sensor, and/or image sensor for measuring the force applied to the touch panel pointing device 115.

The touch panel pointing device 115 may be configured to identify pointer movement from the points of contact, for example as a point of contact moves over time. The touch panel pointing device 115 may further identify one or more gestures, such as a drag gesture or a pinch gesture, based on movement of the points of contact. In some embodiments, the touch panel pointing device 115 may be integrated with a display device, for example, as a touchscreen or similar touch-sensitive display.

The click action module 120, in one embodiment, is configured to determine a number of touch points for a click action of the touch panel pointing device 115, determine a touch force for each touch point of the click action, identify a number of click points for the click action based on the touch force of each touch point, and output a click event based on the number of click points. In some embodiments, the click action module 120 monitors for and detects a click action at the touch panel pointing device 115. The click action module 120 may also identify locations associated with each touch point of the click action.

In one embodiments, the click action module 120 may be implemented as a device driver for the touch panel pointing device 115, providing a software interface to the touch panel pointing device 115. In another embodiment, the click action module 120 may be implemented as a controller and/or as firmware of the touch panel pointing device 115.

A user of the electronic device 101 may use the touch panel pointing device 115 to navigate a user interface, for example, provided by an operating system or application executing on the electronic device 101. In some embodiments, the user may interact with the user interface by performing a click action on the touch panel pointing device 115. The click action module 120 interprets the click action and outputs an appropriate pointer event (e.g., click event).

The click action module 120 identifies a number of fingers actively involved in the click action, wherein the output pointer event is selected based on the number of fingers actively involved in the click action), as described below with reference to FIGS. 2 and 3A-3D. For example, where one finger is actively involved in the click action, the output pointer event may be selected from a subset of pointer events associated with a single finger. As another example, where two fingers are actively involved in the click action, the output pointer event may be selected from a subset of pointer events associated with two fingers. In some embodiments, the click action module 120 uses finger location data (e.g., touch point data) and/or finger motion data to select the appropriate pointer event from a subset based on the number of actively involved fingers.

Figure 2:
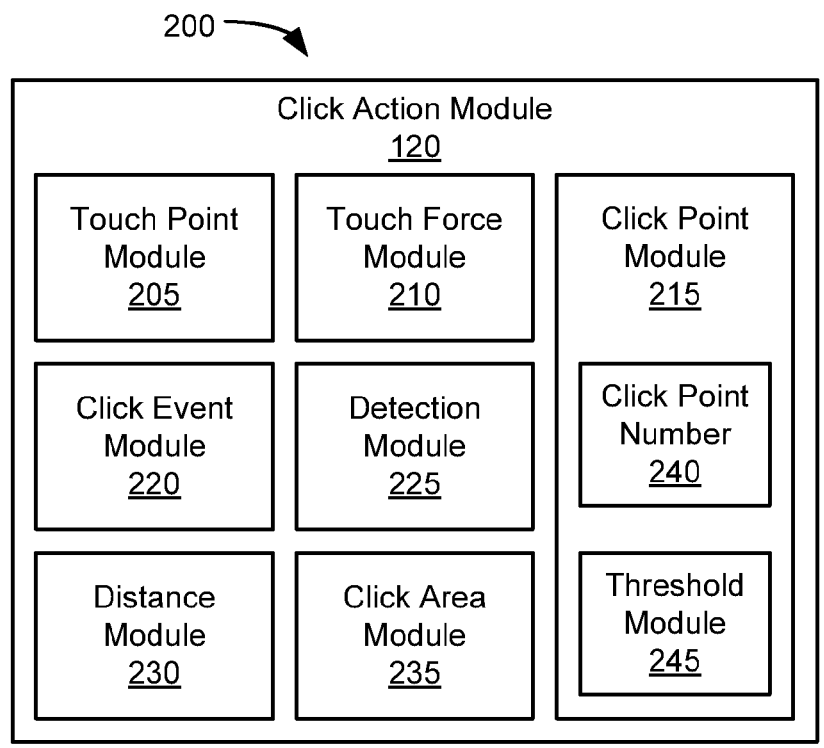
FIG. 2 is a schematic block diagram illustrating one embodiment of an apparatus for interpreting a click action.

FIG. 2 depicts a click action apparatus 200 for interpreting a click action, according to embodiments of the disclosure. The click action apparatus 200, in one embodiment, includes a click action module 120. The click action module 120 may be substantially similar to the click action module 120 described above with reference to FIG. 1. The click action module 120 includes a touch point module 205, a touch force module 210, a click point module 215, and a click event module 220. In some embodiments, the click action module 120 may additionally include one or more of: a detection module 225, a distance module 230, a click area module 235, a click point number 240, and a threshold module 245.

The touch point module 205, in one embodiment, is configured to determine a number of touch points for the click action of the touch panel pointing device 115, when the click action comprises at least one touch point. As used herein a touch point refers to a point where a user is touching the touch panel pointing device 115. For example, the touch point may be a point on the touch panel pointing device 115 where a user's finger (or glove, stylus, etc.) is touching. The touch panel pointing device 115 may be configured to detect a plurality of touch points, wherein the touch point module 205 identifies each touch point associated with a click action.

As used herein, a click action refers to the user's action of "clicking" the touch panel pointing device 115. The click action may comprise the user tapping the touch panel pointing device 115 with a finger, stylus, digital pen, or the like. In some embodiments, the user performs a click action to input a button click (e.g., a single click or double-click), a button press, or similar pointer input.

The touch point module 205 analyzes input from the touch panel pointing device 115 to identify each touch point involved with the click action. In some embodiments, the touch point module 205 identifies a plurality of touch points associated with the click action. In some embodiments, a touch point may correspond to a finger actively involved in the click action. In other embodiments, a touch point may correspond to a finger passively involved in the click action (a resting finger or a finger making inadvertent contact with the touch panel pointing device 115). The touch point module 205 may store the number of touch points in memory and/or may provide the determined number of touch points one or more of the touch force module 210, click point module 215, and distance module 230.

In some embodiments, the touch point module 205 is further configured to identify a location for each touch point. As used herein, the location of the touch point refers to the physical location of the touch point with respect to the touch panel pointing device 115. In some embodiments, the location of the touch point is expressed as coordinates on the touch panel pointing device 115. In other embodiments, the location of the touch point is expressed as a position vector originating from a corner of the touch panel pointing device 115. The touch point module 205 may store the location of each touch point in memory 110 and/or may provide the determined touch point location(s) to one or more of the touch force module 210, click point module 215, click event module 220, distance module 230, and click area module 235.

The touch force module 210, in one embodiment, is configured to determine a touch force for each touch point of the click action. As used herein, the touch force refers to an amount of force or pressure used to implement (trigger) the click action. As described above, the touch panel pointing device 115 may include one or more sensors for measuring a force applied to the touch panel pointing device 115. For example, the touch panel pointing device 115 may include a pressure sensor, capacitive sensor, and/or image sensor for measuring the force applied to the touch panel pointing device 115. The touch force module 210, in some embodiments, acquires force/pressure data from the touch panel pointing device 115 and identifies a touch force associated with each touch point of the click action. The touch force module 210 may store the touch force of each touch point in memory 110 and/or may provide the determined touch force to the click point module 215.

The click point module 215, in one embodiment, is configured to determine a number of click points for the click action, based on the touch force of each touch point. As used herein, a click point refers to a touch point where an actively involved finger touches the touch panel pointing device 115. The click point is a point on the touch panel pointing device 115 where the user intentionally presses to initiate the click action. As a result, a touch point corresponding to a finger resting on the touch panel pointing device 115 or a finger unintentionally contacting the touch panel pointing device 115 does not result in a click point.

If only one touch point is associated with the click action, then the click point module 215 may associate one click point with the click action. If more than one touch point is associated with the click action, then the click point module 215 is thus configured to analyze the touch force associated with each touch point to ignore (e.g., filter out) fingers resting on or unintentionally contacting the touch panel pointing device 115.

In some embodiments, the click point module 215 includes a click point number 240 that stores a number of click points associated with the click action. The click point number 240 indicates a number of fingers actively involved in the click action, also referred to as the number of active fingers. In one embodiment, the click point number 240 comprises a register for the storage device of the click point module 215. In another embodiment, the click point number 240 may be stored in memory 110.

In some embodiments, the click point module 215 identifies the number of click points by comparing the touch force for each touch point to one or more thresholds. In certain embodiments, the click point module 215 includes a threshold module 245 that stores one or more thresholds and/or compares a touch force for each touch point to one or more thresholds.

In one embodiment, the touch force for each touch point is compared to an predefined force threshold (e.g., a click force threshold), wherein the touch force must be above the predefined force threshold for the touch point to be identified as a click point (e.g., for the contacting finger to be a finger actively involved in the click action). The predefined click force threshold represents an absolute (e.g., an objective) standard, where each touch point is compared to the click force threshold without regard to locations and/or forces associated with another touch point. In response to the touch force of a particular touch point exceeding the click force threshold, the click point module 215 identifies that particular touch point as a click point.

In a further embodiment, the force threshold may be based on a location of the touch point and/or a distance between adjacent touch points. In certain embodiments, the threshold module 245 may select one of a plurality of click force thresholds based on the distance between adjacent touch points. For example, two fingers close together may be more likely to inadvertently pass the click force threshold even if the user's intent is the only have one finger press. Accordingly, the threshold module 245 may select a higher click force threshold to reduce the likelihood that two fingers close together will both be identified as a click point if the user's intent is the only have one finger press.

In some embodiments, threshold module 245 may select a higher force threshold for touch point located in a boundary region of the touch panel pointing device 115. For example, a "resting" finger may be inadvertently located on in the boundary region of the touch panel pointing device 115, wherein the user applies force to the "resting" finger when making a click action. To improve accuracy, and avoid identifying the "resting" finger as one actively involved in the click action, the click point module 215 (or, alternatively the threshold module 245) may compare the touch force associated with the "resting" finger to a boundary force threshold, the boundary force threshold being greater than the click force threshold. The click point module 215 may ignore the "resting" finger in response to the touch force being less than the boundary force threshold, even if the touch force is greater than the click force threshold.

In another embodiment, identifying a particular touch point as a click point includes identifying a difference between touch forces of two touch points (if the number of touch points is two or more) and comparing the difference between adjacent touch forces to a force difference threshold. The force difference threshold represents a comparative (e.g., subjective) standard, where the touch force of each touch point is analyzed with consideration to locations and/or forces associated with another touch point. In response to the difference between touch forces of a particular touch point pairing exceeding the force difference threshold, the click point module 215 identifies only one touch point of the touch point pairing as a click point.

In response to the difference between touch forces not exceeding the force difference threshold, the click point module 215 (or, alternatively, the threshold module 245) may compare the touch force associated with each touch point of the pairing to the click force threshold, wherein both touch points are identified as click points if the touch force exceeds the click force threshold, and neither touch point is identified as a click point if the touch force does not exceed the click force threshold.

In some embodiments, the threshold module 245 may select a force difference threshold based on the distance between the two touch points. As an example, two touch points may be located near each other, one touch point associated with an active finger and the other with a resting finger. In some embodiments, a force sensor of the touch panel pointing device 115 may be unable to clearly identify the touch forces associated with each touch point due to the nearness of the touch points. In other embodiments, a user may unintentionally apply force to the resting finger due to the nearness of the fingers (e.g., touch points). Accordingly, the force difference threshold may be lower in response to the distance between two touch points being below a particular distance threshold.

In some embodiments, identifying a particular touch point as a click point includes incrementing the number of click points (e.g., the click point number 240). The number of click points may be incremental only once per touch point. In another embodiment, identifying a particular touch point as a click point include modifying a value corresponding to the particular touch point in bitmap, or other data structure, to a value indicating the touch point is a click point. For example, a three-bit bitmap may be created (e.g., by the touch by module 205) for a click action including three touch points, wherein each bit is given a default value (e.g., zero). The click point module 215 may modify the first bit (e.g., corresponding to the first touch point) in response to the first touch point being identified as a click point (e.g., the touch force of the first touch point exceeding the click force threshold).

The click event module 220, in one embodiment, is configured to output a click event based on the number of click points (e.g., based on the number fingers actively involved in the click action). As used herein a click event refers to a system pointer event generated in response to a click action. In one embodiment, the pointer event may be a left-button click, left-button double-click, a right-button click, a right-button double-click, a middle-button click, a middle-button double-click, or the like. In another embodiment, the click event may be a drag event, a button-down event, a button up event, or the like. In some embodiments, a button click may be associated with a primary event, a secondary event, a tertiary event, or the like, based on system preferences.

In some embodiments, the click event module 220 receives an indication of the number of click points (e.g., number of active fingers) of the click action from the click point module 215. In other embodiments, the click event module 220 may access the click point number 240 and/or the memory 110 to retrieve the number of click points. In certain embodiments, the click event module 220 may access a lookup table (LUT) that correlates a point number of click points (e.g., the click point number 240) to a particular click event.

In certain embodiments, the click event module 220 outputs a secondary click event in response to the number of click points being two and a primary click event in response the number of click points being one. In further embodiments, click event module 20 may output a tertiary click event in response the number of click points being three and additional click prevents in response to the number of click points being four or more. Accordingly, matching outcomes may be associated with three or more active click fingers. These matching outcomes, in one embodiment, are customized by the user and/or the touch panel pointing device 115 provider.

In further embodiments, if the number of click points (e.g., number fingers actively involved) is equal to one, then the click event module 220 identifies a click location (e.g., a location of the click point) and produces a click event further based on the click location. For example, the click event module 220 may produce a secondary click event in response to the click location being within a first click zone and a primary click event in response to the click location being outside the first click zone, as discussed in further detail below. In one embodiment, identifying the click point location includes the click event module 220 querying the touch point module 205 for the touch point location of the click point identify the by the click point module 215.

In some embodiments, the pointer event comprises a gesture event, such as a drag gesture or a pinch gesture. The drag gesture may be associated with a single-finger click action, followed immediately by movement of a touch point. A pinch gesture may be associated with a two-finger click action, followed immediately by movement of one or both of the touch points. In some embodiments, a finger resting or making inadvertent contact with the touch panel pointing device 115 causes a user-intended drag gesture to appear as a pinch gesture. Likewise, a user-intended pinch gesture may unintentionally appear as a three-finger gesture due to the finger resting or making inadvertent contact with the touch panel pointing device 115. Accordingly, the click event module 220 may use the number of actively involved fingers (as determined based on the number of click points) to eliminate the finger resting or making inadvertent contact with the touch panel pointing device 115 and properly interpret the drag gesture or pinch gesture. Other gestures may similarly be clarified based on the number of click points (e.g., active fingers) involved.

The detection module 225, in one embodiment, is configured to monitor for and detect a click action from a touch panel pointing device. For example, the detection module 225 may continually analyze user input at the touch panel pointing device 115 to distinguish a click action from other user input. In some embodiments, the detection module 225 detects the click action by monitoring for a force/pressure applied to the touch panel pointing device 115 that exceeds a click action threshold. In further embodiments, the click action threshold may be the same as the predefined click force threshold used by the click point module 215 to distinguish an actively involved finger from arresting finger, as discussed above. In other embodiments, the detection module 225 may detect the click action by monitoring an application programming interface (API) associated with the touch panel pointing device 115.

The distance module 230, in one embodiment, is configured to measure a distance between adjacent touch points, in response to the number of touch points being at least two. In some embodiments, where the number of touch points is at least three, the distance module 230 identifies a plurality of combinations of two touch points and measures the distance between touch points for each combination. The distance module 230 may indicate the measured distance to the click point module 215, wherein the click point module 215 determines a number of click points based in part on the distance between touch points. For example, the click point module 215 may select a force difference threshold used to identify click point based on whether the distance exceeds a particular distance threshold.

The click area module 235, in one embodiment, is configured to compare the click location of a click point to one or more click areas or zones. In some embodiments, the click area module 235 compares the click location to the one or more click zones in response to the number of click points being one. As used herein, a click area or a click zone refers to the region of the touch panel pointing device 115. In some embodiments, each click area or click zone is associated with a particular click event. For example the touch panel pointing device 115 may include a left click zone, a right-click zone, and the middle click zone. The click area module 235 may indicate to the click event module 220 that the click location is within a click area, wherein the click event module 220 outputs a click event based on the area.

As an example, the click area module 235 may compare the click location to a first click area associated with a secondary click event (e.g., a right-button click). The click event module 220 may then output a secondary click event in response to the click location big within the first click area, and otherwise output a primary click event. In a further example, the click area module 235 may compare the click location to a second click area associated with the tertiary click event (e.g., a middle-button click), wherein the click event module 220 outputs a secondary click event in response to the click location being within the first area, a tertiary click event in response to the click location being within the second area, and a primary click event in response to the click location being outside of both the first area and the second area. In certain embodiments, the primary click event is a left-button click, the secondary click event is a right-button click, and the tertiary click event is a middle-button click.

In some embodiments, the click area module 235 may identify whether a touch point resides within a boundary region of the touch panel pointing device 115. The boundary region may be an area along the perimeter of the touch panel pointing device 115. In some embodiments, a user may inadvertently place a resting finger within the boundary region, believing that the resting finger is placed outside the location-sensing area of the touch panel pointing device 115. The click area module 235 may indicate to the click point module 215 that a touch point resides within the boundary region, wherein the click point module 215 applies different force thresholds (e.g., a boundary force threshold) when determining whether the touch point is a click point (e.g., corresponding to a finger actively involved in the click action).

Accordingly, the click action module 120 may detect a click action using the detection module 225. Upon detecting a click action, the touch point module 205 may identify a number of touch points of the click action and the touch force module 210 may identify a touch force associated with each touch point of the click action. The click module 215 may determine whether a touch point is a click point based on the touch force, so as to distinguish fingers actively involved in the click action from a finger resting or making inadvertent contact with the touch panel pointing device 115. The click event module 220 may output a click event (or pointer event) based on the number of click points. For example, if two click points are detected than a secondary click event (e.g., a right-button click) may be produced.

In some embodiments, if the click action includes only one click point, the click event module 220 may produce a click event further based on the location of the click point. For example, if the click point is located within a first zone, then a secondary click event may be produced and a primary click event may be produced if the click point is not located within the first zone. In this way, the click action module 120 may intelligently interpret the user's click action to more accurately output a click event corresponding to the user's intention.

FIGS. 3A-3D depict embodiments of a touchpad 300 for interpreting a click action. The touchpad 300, in one embodiment, may include a click action module 120 described above with reference to FIG. 2. In one embodiment, the touch pad 300 may be substantially similar to the electronic device 101, described above with reference to FIG. 1. The touchpad 300 includes a tactile sensor 302 capable of sensing one or more points of contact, locations of the same, and a force/pressure associated with each point of contact. Points of contact may occur when a finger touches the touchpad 300.

FIG. 3A is a schematic block diagram illustrating one embodiment of the touchpad 300 detecting a click action. As depicted, the touchpad 300 includes a right-button zone 308 and a left-button zone 310. The tactile sensor 302 detects two points of contact (an active touch point 304 and a passive touch point 306) associated with the click action. A conventional trackpad is unable to determine whether the user's intent is to input a one finger click action (e.g., one active finger and one resting/pointing finger) or a two fingered click action (e.g., two active fingers).

In one embodiment, the touchpad 300 identifies a touch force associated with each touch point 304 and 306 to identify whether the point of contact is due to a finger actively involved in the click action. Here, the touchpad 300 determines (e.g., based on touch forces) that the active touch point 304 corresponds to the point of contact of an actively involved finger while the passive touch point 306 corresponds to the point of contact of a resting finger.

As only one finger is actively involved in the click action, the touchpad 300 identifies a location of the active touch point and compares it to the right-button zone 308 and the left-button zone 310. As depicted, the active touch point 304 is located within the left-button zone 310. Accordingly, the touchpad 300 produces a left-button click event. In response to the active touch point 304 being located within the right-button zone 308, the touchpad 300 may produce a right-button click event.

FIG. 3B is a schematic block diagram illustrating an embodiment of the touchpad 300 detecting another click action. The tactile sensor 302 again detects two points of contact (the active touch point 304 and a border touch point 312) associated with the click action. In one embodiment, the touchpad 300 identifies a touch force associated with each touch point 304 and 312 to identify whether a point of contact is due to a finger actively involved in the click action.

Here, the touchpad 300 may compare the active touch point 304 to a first (e.g., default) click force threshold, but compare the border touch point 312 to a second force threshold (e.g., a border threshold), the second threshold being greater than the first. In one embodiment, active touch point 304 and the border touch point 312 are associated with actively involved fingers, wherein the touchpad 300 may produce a secondary click event, such as a right-button click event. In another embodiment, only the active touch point 304 is associated with an actively involved finger, due to the force/pressure associated with the border touch point 312 being less than the border force threshold. Here, the touchpad may produce a primary click event, such as a left-button click event, due to the click action having only one actively involved finger.

FIG. 3C is a schematic block diagram illustrating an embodiment of the touchpad 300 detecting another click action. As depicted, the tactile sensor 302 detects two points of contact (the active touch point 304 and the passive touch point 306) associated with the click action. Additionally, the tactile sensor 302 may detect movement associated with the active touch point 304. A conventional trackpad is unable to determine whether the user's intent is to input a drag gesture (e.g., using one active finger and one resting/pointing finger) or a pinch gesture (e.g., using two active fingers).

In one embodiment, the touchpad 300 identifies a touch force associated with each touch point 304 and 306 and compares the associated touch forces to the first (e.g., default) click force threshold to identify whether the point of contact is due to a finger actively involved in the click action. Here, the touchpad 300 determines (e.g., based on touch forces) that the active touch point 304 corresponds to the point of contact of an actively involved finger while the passive touch point 306 corresponds to the point of contact of a resting finger. Accordingly, as only one finger is actively involved in the click action, the touchpad 300 may produce a drag click event, corresponding to the intended drag gesture.

FIG. 3D is a schematic block diagram illustrating an embodiment of the touchpad 300 detecting another click action. As depicted, the tactile sensor 302 detects three points of contact (two active touch points 304 and a passive touch point 306) associated with the click action. A conventional trackpad is unable to determine whether the user's intent is to input a two-finger click action or a three-finger click action.

Here, the trackpad 300 identifies a touch force associated with each of the touch points 304 and 306 and compares the associated touch forces to the first (e.g., default) click force threshold to identify whether a point of contact is due to a finger actively involved in the click action. In the depicted click action, the touchpad 300 determines (e.g., based on touch forces) that each active touch point 304 corresponds to the point of contact of an actively involved finger, while the passive touch point 306 corresponds to the point of contact of a resting finger. Accordingly, as only two fingers are actively involved in the click action, the touchpad 300 may produce a two-finger click event, such as a secondary (e.g., right-button) click event.

Figure 4:
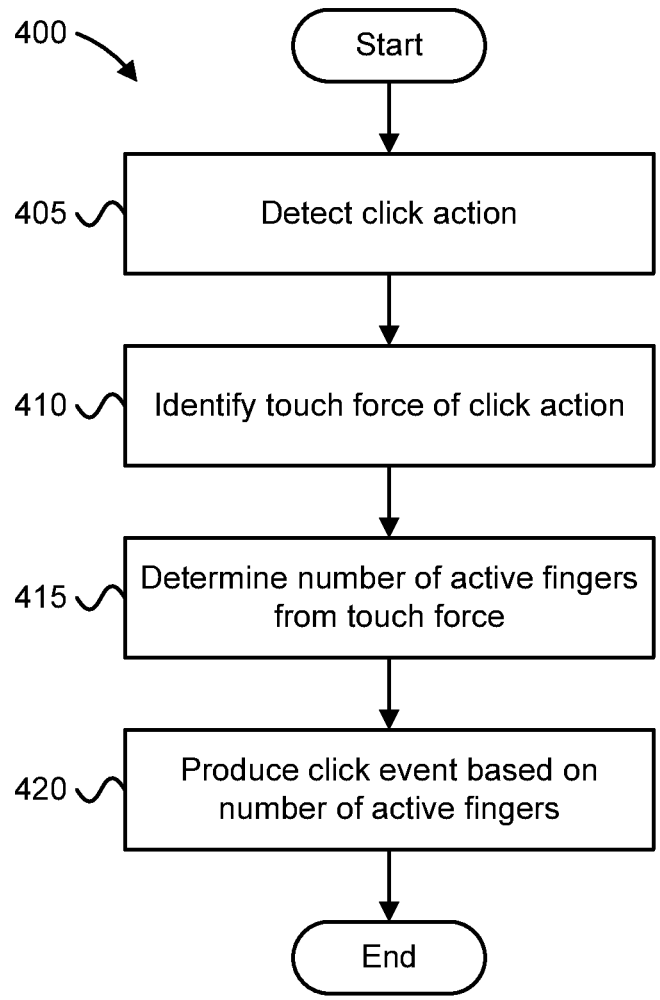
FIG. 4 is a schematic flow chart diagram illustrating one embodiment of a method for interpreting a click action.

FIG. 4 is a schematic flow chart diagram illustrating another embodiment of a method for interpreting a click action. In one embodiment, the method 400 is performed by the electronic device 101. In another embodiment, the method 400 may be performed by the click action apparatus 200. Alternatively, the method 400 may be performed by a computer readable storage medium, such as the memory 110. The computer readable storage medium may store code that is executed on the processor 105 to perform the functions of the method 400.

The method 400 begins and the click action device detects 405 a click action from a touch panel pointing device, such as the touch panel pointing device 115. In some embodiments, detecting 405 the click action includes the detection module 225 identifying a press of the touch panel pointing device 115 exceeding a predetermined, click action threshold. In response to detecting the click action, the click action device identifies 410 a touch force of the click action. In some embodiments, identifying 410 the touch force of the click action includes measuring a force and/or pressure applied to the touch panel pointing device 115 at one or more touch points.

The click action device determines 415 a number of fingers actively involved in the click action based on the touch force. In some embodiments, determining 415 the number actively involved fingers includes determining a number of touch points associated with the click action and comparing the touch force associated with each touch point to a click force threshold. In certain embodiments, determining 415 the number of actively involved fingers further includes incrementing the number of fingers actively involved in the click action for each touch point whose touch force exceeds the click force threshold. In further embodiments, the click force threshold may be the same predetermined, click action threshold used to initially detect the click action.

The click action device produces 420 a click event based on the number fingers actively involved in the click action. In some embodiments, producing 420 the click event based on the number of actively involved fingers includes identifying a click location of the click action, in response to the number fingers actively involved being equal to one, wherein the click event is further based on the click location. For example, the click location may be compared to a one or more zones on the touch panel pointing device, wherein producing 420 the click event includes outputting a click event corresponding to a zone containing the click location. The method 400 ends.

Figure 5:
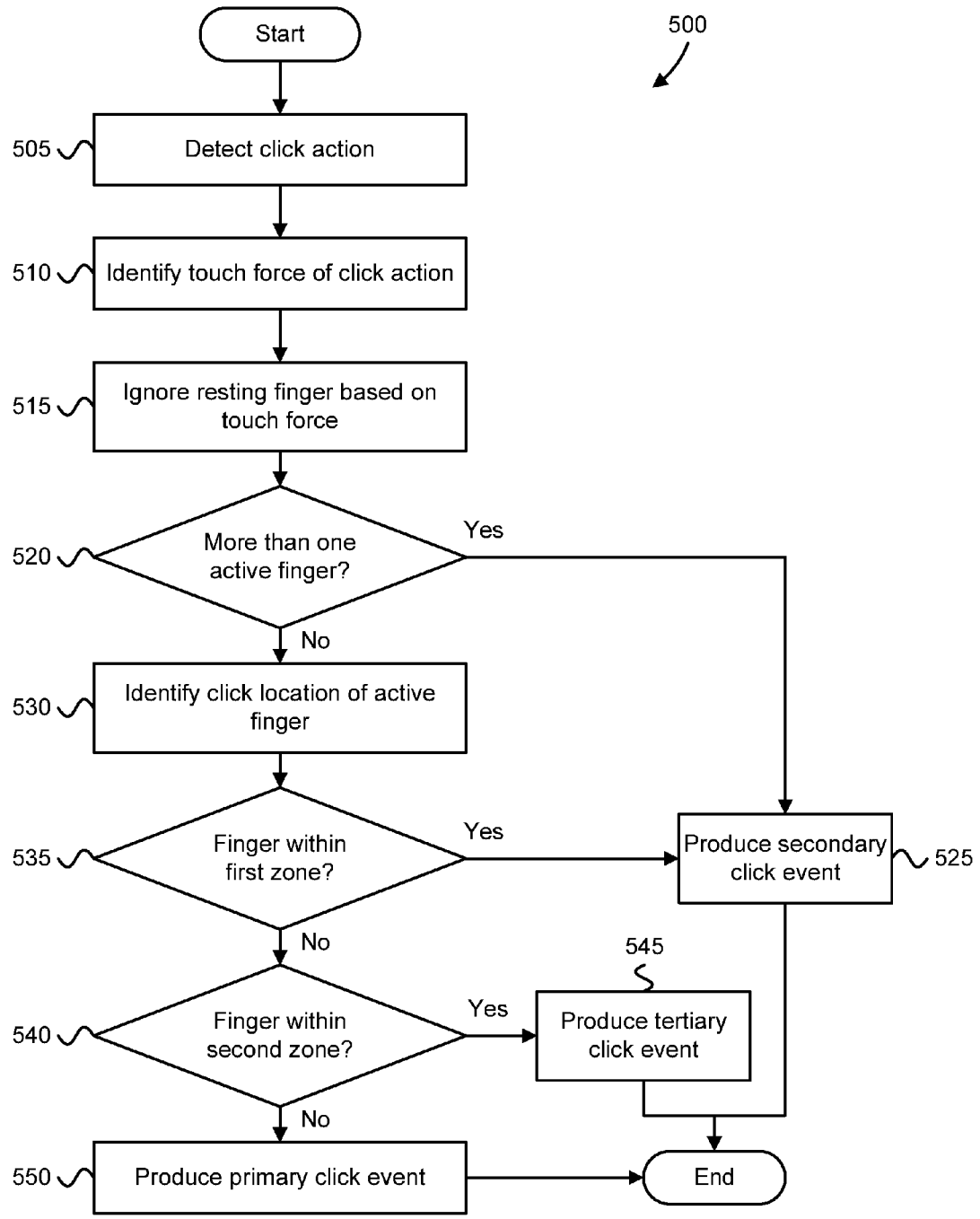
FIG. 5 is a schematic flow chart diagram illustrating another embodiment of a method for interpreting a click action.

FIG. 5 is a schematic flow chart diagram illustrating another embodiment of a method for interpreting a click action. In one embodiment, the method 500 is performed by the electronic device 101. In another embodiment, the method 500 may be performed by the click action apparatus 200. Alternatively, the method 500 may be performed by a computer readable storage medium, such as the memory 110. The computer readable storage medium may store code that is executed on the processor 105 to perform the functions of the method 500.

The method 500 begins and the click action device detects 505 a click action at the touch panel pointing device 115. In response to detecting 605 the click action, the click action device identifies 410 a touch force of the click action. In one embodiment, the touch panel pointing device 115 includes a force/pressure sensor for measuring the amount of force/pressure a user applies during the click action at each point of contact with the touch panel pointing device 115.

The click action device ignores 515 one or more resting fingers associated with the click event based on the touch force. In some embodiments, ignoring 515 the resting fingers includes determining a number of touch points associated with the click action and comparing the touch force associated with each touch point to a click force threshold. A finger may be identified as an active finger if the touch force exceeds the click force threshold, and as a resting finger if the touch force does not exceed the click force threshold.

The click action device determines 520 if there is more than one finger actively involved in the click action. As described above, and actively involved finger may be identified for each touch point whose touch force exceeds the click force threshold. In response to the click action device determining that more than one finger is actively involved in the click action, then the click action device produces 525 a secondary click event and the method 500 ends. In one embodiment the secondary click event is a right-button click event.

Otherwise, in response to the click action device determining that only one finger is actively involved in the click action, then the click action device identifies 530 a click location associated with the click action. In one embodiment, the click location is a physical location of the actively involved finger's point of contact with the touch panel pointing device 115. The click action device further determines 535 whether the active finger's click location is within a first zone. In some embodiments, the first zone defines a right-button area on the touch panel pointing device 115. In response to the active finger's click location being within the first zone, the click action device produces 525 a secondary click event and the method 500 ends.

Otherwise, in response to the active finger's click location not being within the first zone, then the click action device determines 540 whether the active finger's click location is within a second zone. In some embodiments, the second zone defines a middle-button area on the touch panel pointing device 115. In response to the active finger's click location being within the second zone, the click action device produces 545 a tertiary click event and the method 500 ends. In one embodiment, the tertiary click event is a middle-button click event. Otherwise, in response to the active finger's click location not being within the second zone, then the click action device produces 550 a primary click event and the method 500 ends. In one embodiment, the primary click event is a left-button click event.

Figure 6:
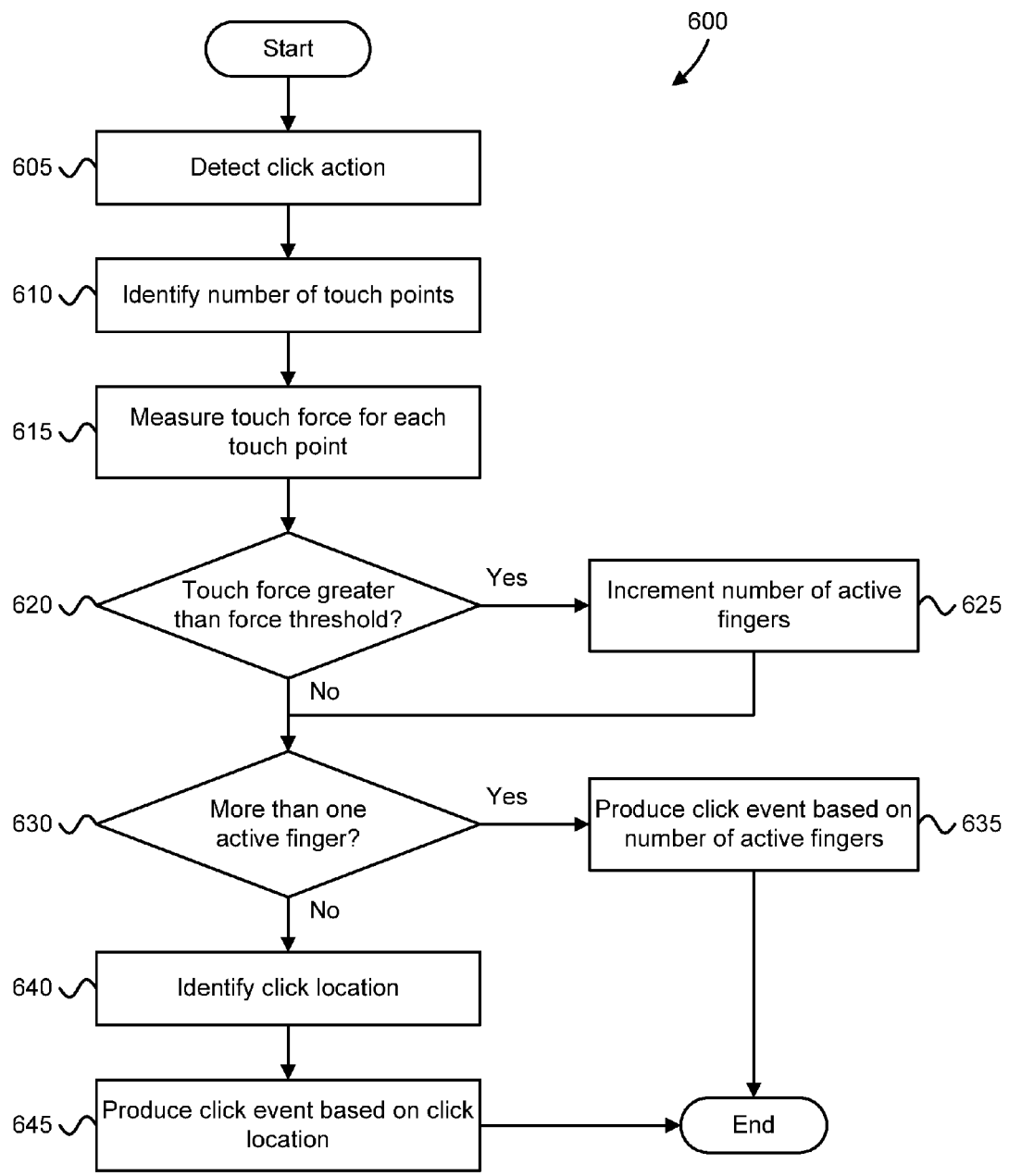
FIG. 6 is a schematic flow chart diagram illustrating another embodiment of a method for interpreting a click action.

FIG. 6 is a schematic flow chart diagram illustrating another embodiment of a method for interpreting a click action. In one embodiment, the method 600 is performed by the electronic device 101. In another embodiment, the method 600 may be performed by the click action apparatus 200. Alternatively, the method 600 may be performed by a computer readable storage medium, such as the memory 110. The computer readable storage medium may store code that is executed on the processor 105 to perform the functions of the method 600.

The method 600 begins and the click action device detects 605 a click action at the touch panel pointing device 115. In response to detecting 605 the click action, the click action device determines 610 a number of touch points associated with the click action, wherein the click action includes at least one touch point. In one embodiment, a touch point corresponds to a point of contact with the touch panel pointing device 115 of a finger involved in the click action. The click action device further measures 615 a touch force associated with each touch point of the click action.

The click action device determines 620, for each touch point, whether the touch force is greater than a predefined force threshold, such as the click force threshold described above with reference to FIG. 2. In response to the touch force being greater than the force threshold, the click action device increments 625 the number of fingers actively involved in the click action, wherein the click action includes at least one actively involved finger. Otherwise, in response to the touch force not being greater than the force threshold, does not increment the number of actively involved fingers, wherein the click action includes at least one actively involved finger.

After determining 620 whether the touch force is greater than the force threshold for all touch points, the click action device determines 630 whether more than one fingers actively involved in the click action. As discussed above, a click action includes at least one actively involved finger. In response to more than one finger being actively involved in the click action, the click action device produces 635 a click event based on the number of active fingers. In one embodiment, the click action device produces 635 a secondary click event based on the number of active fingers being two.

Otherwise, in response to only one finger being actively involved in the click action, the click action device identifies 640 a click location associated with the click action. In some embodiments, the click location corresponds to the physical point of contact of the actively involved finger on the touch panel pointing device 115. The click action device then produces 645 a click event based on the click location and the method 600 ends. In some embodiments, the click location may be compared to a one or more zones on the touch panel pointing device, wherein producing 645 the click event based on click location includes outputting a click event corresponding to a zone containing the click location.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a touch panel;
   a processor;
   a memory that stores code executable by the processor to:
   monitor an amount of force applied to the touch panel;
   detect a click action in response to the amount of force applied to the touch panel exceeding a click action threshold;
   determine a number of touch points for the click action in response to the amount of force applied to the touch panel exceeding the click action threshold;
   measure a touch force for each touch point of the click action;
   measure a distance between adjacent touch points in response to the number of touch points being at least two;
   identify a number of click points for the click action by comparing the touch force of each touch point to a click force threshold, wherein the click force threshold is based on the distance between adjacent touch points; and
   output a click event based on the number of click points.

2. The apparatus of claim 1, wherein identifying a number of click points by comparing the touch force of each touch point to a click force threshold comprises:
   comparing the touch force for each touch point to the click force threshold; and
   incrementing the number of click points for each touch point whose touch force exceeds the click force threshold.

3. The apparatus of claim 1, wherein the processor further:
   determines a click location associated with the click action, in response to the number of click points being one; and
   compares the click location to a first area, wherein outputting a click event comprises outputting a secondary click event in response to the click location being within the first area.

4. The apparatus of claim 3, wherein the click location comprises a location on the touch panel and the first area comprises a region of the touch panel.

5. The apparatus of claim 3, wherein outputting the click event comprises outputting a primary click event in response to the click location being outside the first area.

6. The apparatus of claim 5, wherein the primary click event comprises a left-button click event and the secondary click event comprises a right-button click event.

7. The apparatus of claim 1, wherein outputting a click event comprises outputting a secondary click event in response to the number of click points being two.

8. A method comprising:
   monitoring an amount of force applied to a touch panel;
   detecting, by use of a processor, a click action from a touch panel pointing device in response to the amount of force applied to the touch panel exceeding a click action threshold;
   determining a number of touch points for the click action in response to the amount of force applied to the touch panel exceeding the click action threshold;

identifying a touch force for each touch point of the click action, wherein the number of touch points for the click action is at least two;

identifying a touch force difference for each pair of touch points, the touch force difference being a difference in touch forces of the touch points in the pair;

determining a number of fingers actively involved in the click action by comparing the touch force difference for each pair of touch points to a force difference threshold; and producing a click event based on the number of fingers actively involved in the click action.

9. The method of claim 8, further comprising identifying a click location of the click action in response to the number of fingers actively involved being equal to one, wherein producing the click event is further based on the click location.

10. The method of claim 9, further comprising comparing the click location to a first zone, wherein producing the click event further based on the click location comprises outputting a secondary click action in response to the click location being within the first zone and outputting a primary click action in response to the click location being outside the first zone.

11. The method of claim 9, further comprising defining a plurality of zones on the touch panel pointing device, each zone associated with a click event, wherein producing the click event further based on the click location comprises outputting a click event corresponding to a zone containing the click location.

12. The method of claim 8, wherein determining a number of fingers actively involved in the click action by comparing the touch force difference for each pair of touch points to a force difference threshold comprises:

comparing the touch force for each touch point in a pair of touch points to a click force threshold in response to the touch force difference not exceeding the force difference threshold, wherein both touch points are identified as click points if the touch force exceeds the click force threshold, and neither touch point is identified as a click point if the touch force does not exceed the click force threshold.

13. The method of claim 8, wherein the force difference threshold is based on a distance between touch points in the pair of touch points.

14. The method of claim 8, wherein determining the number of fingers actively involved in the click action based on the touch force comprises ignoring a finger resting on the touch panel pointing device.

15. A program product comprising a non-transitory computer readable storage medium that stores code executable by a processor, the executable code comprising code to perform:

monitoring for a click action at a touch panel pointing device, the click action comprising application of an amount of force at the touch panel pointing device that exceeds a click action threshold;

determining a number of touch points for the click action in response to the amount of force applied to the touch panel pointing device exceeding the click action threshold, wherein the click action comprises at least two touch points;

measuring a touch force associated with each touch point of the click action;

determining a number of click points for the click action by one of comparing the touch force of each touch point to a click force threshold and comparing a touch force difference for a pair of touch points to a force difference threshold, wherein the click force threshold is based on a distance between adjacent touch points; and generating a pointer event based on the number of click points, wherein the number of click points is at least one.

16. The program product of claim 15, further comprising code to perform determining a touch panel pointing device location for each touch point, wherein determining a number of click points for the click action comprises ignoring a particular touch point located in a boundary region of the touch panel pointing device, in response to the touch force associated with the particular touch point being less than a boundary force threshold, the boundary force threshold being greater than the click force threshold.

17. The program product of claim 15, wherein the pointer event is selected from the group comprising: a left-button click, left-button double-click, a right-button click, a right-button double-click, a middle-button click, and a middle-button double-click, a drag gesture, and a pinch gesture.

18. The program product of claim 15, wherein determining a number of click points for the click action by one of comparing the touch force of each touch point to a click force threshold and comparing a touch force difference for a pair of touch points to a force difference threshold comprises comparing the touch force difference for a pair of touch points to the force difference threshold, the program product further comprising code to compare a touch force for each touch point in a pair of touch points to the click force threshold in response to the touch force difference not exceeding the force difference threshold, wherein both touch points are identified as click points if the touch force exceeds the click force threshold, and neither touch point is identified as a click point if the touch force does not exceed the click force threshold.

19. The program product of claim 15, wherein the force difference threshold is based on a distance between touch points in the pair of touch points.

20. The program product of claim 15, further comprising code to perform identifying a click location of the click action in response to the number of click points being equal to one, wherein generating the pointer event is further based on the click location.

* * * * *